US010120725B2

(12) United States Patent
Jubran et al.

(10) Patent No.: US 10,120,725 B2
(45) Date of Patent: Nov. 6, 2018

(54) ESTABLISHING AN INITIAL CONFIGURATION OF A HARDWARE INVENTORY

(75) Inventors: Marwan E Jubran, Redmond, WA (US); Aleksandr Gershaft, Redmond, WA (US); Weiping Hu, Bellevue, WA (US); Vitalii Tsybulnyk, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/531,136

(22) Filed: Jun. 22, 2012

(65) Prior Publication Data

US 2013/0346260 A1 Dec. 26, 2013

(51) Int. Cl.
G06Q 30/06 (2012.01)
G06Q 10/06 (2012.01)
(Continued)

(52) U.S. Cl.
CPC ......... *G06F 9/5072* (2013.01); *G06Q 10/087* (2013.01)

(58) Field of Classification Search
CPC .... G06F 21/74; G06F 2221/2105; G06F 9/50; G06F 2009/45595; G06F 3/0631;
(Continued)

(56) References Cited

U.S. PATENT DOCUMENTS 7,493,653 B2  2/2009 Klein
7,746,860 B2  6/2010 Tams et al.
(Continued)

FOREIGN PATENT DOCUMENTS

CN  102339281 A  2/2012
EP  1250785  8/2007
(Continued)

OTHER PUBLICATIONS

Hirschfeld, et al., "Bootstrapping OpenStack Clouds", Retrieved on: Dec. 30, 2011, 15 pages Available at: http://www.rackspace.com/downloads/pdfs/dell_tech_wp-bootstrapping_openstack_clouds.pdf.

(Continued)

*Primary Examiner* — Ig T An
(74) *Attorney, Agent, or Firm* — Shook, Hardy and Bacon, L.L.P.

(57) ABSTRACT

Methods, systems, and computer-readable media for automatically configuring an inventory of hardware to interact seamlessly with a datacenter are provided. Initially, customer-specific specifications are collected from a user, which are automatically supplemented with platform-specific specifications. These specifications are used to select the hardware inventory from a set of predefined hardware clusters, where each of the predefined hardware clusters represents compatible configurations of hardware assets and logical assets that have been demonstrated to function congruently. A cluster-configuration file is derived from data held within a stock-keeping unit (SKU) that describes the selected hardware inventory. The cluster-configuration file is populated with abstract symbolic representations that act as placeholders for expected values that are presently unknown. Network resources are assigned by automated conversion of the abstract symbolic representations into concrete values. The cluster-confirmation file is merged with previous versions of datacenter inventory to create an updated version of the datacenter inventory.

20 Claims, 7 Drawing Sheets

(51) Int. Cl.
   *G06Q 10/08*   (2012.01)
   *G06Q 10/10*   (2012.01)
   *G06F 3/06*    (2006.01)
   *G06F 9/455*   (2018.01)
   *H04L 12/24*   (2006.01)
   *G06F 9/50*    (2006.01)

(58) Field of Classification Search
   CPC . H04L 67/10; H04L 67/1097; G06Q 30/0631; G06Q 10/06; G06Q 10/063; G06Q 10/087; G06Q 10/101; G06Q 30/0621
   See application file for complete search history.

(56) References Cited

U.S. PATENT DOCUMENTS

| | | | |
|---|---|---|---|
| 8,549,869 | B1 | 10/2013 | Whitted et al. |
| 8,625,596 | B1 | 1/2014 | Thomas et al. |
| 8,949,389 | B1 | 2/2015 | Rimmer |
| 2002/0163901 | A1 | 11/2002 | Spratt |
| 2004/0088145 | A1* | 5/2004 | Rosenthal ............ G06F 17/509 703/1 |
| 2004/0119735 | A1 | 6/2004 | Subbarao et al. |
| 2005/0060413 | A1 | 3/2005 | Oyadomari et al. |
| 2005/0182601 | A1 | 8/2005 | Deguchi |
| 2005/0216732 | A1 | 9/2005 | Kipnis et al. |
| 2006/0094291 | A1 | 5/2006 | Caveney |
| 2006/0282529 | A1 | 12/2006 | Nordin |
| 2007/0005994 | A1 | 1/2007 | Bahali et al. |
| 2007/0088630 | A1 | 4/2007 | MacLeod et al. |
| 2007/0180059 | A1 | 8/2007 | Marl et al. |
| 2008/0052437 | A1 | 2/2008 | Loffink |
| 2008/0208897 | A1 | 8/2008 | Melvin et al. |
| 2008/0259816 | A1 | 10/2008 | Archer et al. |
| 2009/0210735 | A1 | 8/2009 | Brown et al. |
| 2010/0036903 | A1 | 2/2010 | Ahmad et al. |
| 2010/0131948 | A1* | 5/2010 | Ferris .................... G06F 9/50 718/1 |
| 2010/0153482 | A1* | 6/2010 | Kim ...................... G06F 8/61 709/201 |
| 2010/0211656 | A1 | 8/2010 | Pagan et al. |
| 2010/0235484 | A1 | 9/2010 | Bolan et al. |
| 2011/0022245 | A1 | 1/2011 | Goodrum et al. |
| 2011/0072255 | A1 | 3/2011 | Gopalakrishnan et al. |
| 2011/0078680 | A1 | 3/2011 | Lagergren et al. |
| 2011/0145392 | A1* | 6/2011 | Dawson ............... G06F 9/5072 709/224 |
| 2011/0154123 | A1 | 6/2011 | Barrall et al. |
| 2011/0172841 | A1 | 7/2011 | Forbes, Jr. |
| 2011/0231822 | A1 | 9/2011 | Sabin et al. |
| 2011/0246793 | A1 | 10/2011 | Davis |
| 2011/0270962 | A1 | 11/2011 | Tameshige et al. |
| 2011/0295633 | A1 | 12/2011 | Bird |
| 2011/0296069 | A1* | 12/2011 | Tarta ..................... G06F 9/526 710/200 |
| 2011/0320849 | A1 | 12/2011 | Cochran et al. |
| 2012/0102186 | A1* | 4/2012 | Rewaskar .......... H04L 41/0816 709/224 |
| 2012/0151040 | A1 | 6/2012 | Mouravyov et al. |
| 2012/0170585 | A1 | 7/2012 | Mehra et al. |
| 2012/0209981 | A1 | 8/2012 | Bolan et al. |
| 2012/0297037 | A1 | 11/2012 | Kumagai et al. |
| 2012/0303767 | A1 | 11/2012 | Renzin |
| 2012/0311111 | A1 | 12/2012 | Frew et al. |
| 2013/0007737 | A1* | 1/2013 | Oh ........................ G06F 9/4445 718/1 |
| 2013/0046884 | A1 | 2/2013 | Frost et al. |
| 2013/0198346 | A1 | 8/2013 | Jubran et al. |
| 2013/0227136 | A1 | 8/2013 | Sturgeon et al. |
| 2014/0039683 | A1 | 2/2014 | Zimmermann et al. |
| 2014/0068057 | A1 | 3/2014 | Burchfield et al. |
| 2014/0101467 | A1 | 4/2014 | Jubran et al. |
| 2014/0119238 | A1 | 5/2014 | Thomas et al. |
| 2014/0173060 | A1 | 6/2014 | Jubran et al. |
| 2014/0298734 | A1 | 10/2014 | Rogers |

FOREIGN PATENT DOCUMENTS

| | | |
|---|---|---|
| EP | 2339778 A1 | 6/2011 |
| EP | 2362578 A1 | 8/2011 |
| GB | 2421153 A | 6/2006 |
| JP | H04123253 A | 4/1992 |
| JP | 2004252800 A | 9/2004 |
| JP | 2007213271 A | 8/2007 |
| WO | 2010119370 A1 | 10/2010 |
| WO | 2011151773 A1 | 12/2011 |
| WO | WO 2011159842 | 12/2011 |

OTHER PUBLICATIONS

"Configuring the Hardware and Software Inventory SMS Feature", Retrieved on: Dec. 30, 2011, 6 pages Available at: http://www.tech-faq.com/configuring-the-hardware-and-software-inventory-sms-feature.html.

"Bootstrapping Applications via AWS CloudFormation", Retrieved on: Dec. 28, 2011, 22 pages Available at: https://s3.amazonaws.com/cloudformation-examples/BoostrappingApplicationsWithAWSCloudFormation.pdf.

"Just Released: StockTrader 5.0, Windows Azure Platform End-to-End Sample Application", Published on: Jun. 30, 2011, 1 page Available at:http://blogs.msdn.com/b/windowsazure/archive/2011/06/30/just-released-stocktrader-5-0-windows-azure-platform-end-to-end-sample-application.aspx.

"System Imaging", Retrieved on: Jul. 20, 2011, 2 pages Available at:http://itservices.stanford.edu/strategy/sysadmin/imaging.

"Understanding Systems Management Server (SMS)", Retrieved on: Dec. 29, 2011, 11 pages, Available at:http://www.tech-faq.com/understanding-systems-management-server-sms.html.

"Vyatta Network OS for Cloud Computing", Retrieved on: Dec. 28, 2011, 3 pages Available at:http://www.vyatta.com/sites/vyatta.com/files/pdfs/vyatta_cloud_datasheet.pdf.

"Windows Azure Bootstrapper", Retrieved on: Dec. 28, 2011, 2, pages Available at:http://bootstrap.codeplex.com/.

Bourgeau, Paul, "Cloud Security: Managing the Cloud with Windows Intune", Published on: Jun. 2010, 6 pages, Available at:http://technet.microsoft.com/en-us/magazine/f742836.aspx.

Casado, et al., "Ripcord: A Modular Platform for Data Center Networking", In Proceedings of the ACM SIGCOMM 2010 conference on SIGCOMM, Jun. 7, 2010, 15 pages.

International Search Report and Written Opinion in PCT/US2013/022358, dated Jun. 21, 2013.

Mudigonda, et al., "NetLord: A Scalable Multi-tenant Network Architecture for Virtualized Datacenters", Published on: Aug. 15-19, 2011, 12 pages Available at:http://www.hpl.hp.com/personal/Praveen_Yalagandula/papers/SIGCOMM2011-NetLord.pdf.

Perera, et al., "A Scalable and Robust Coordination Architecture for Distributed Management", In Department of Computer Science Technical Report TR-659, Indiana University, 2008, 10 pages.

"International Search Report & Written Opinion for PCT Patent Application No. PCT/US2013/074742", dated Apr. 4, 2014, Filed Date: Dec. 12, 2013, 14 Pages.

Non-final Office Action in U.S. Appl. No. 13/360,876, dated May 12, 2014, 19 pages.

International Search Report and Written Opinion in PCT/US2013/046670, dated Oct. 9, 2013, 10 pages.

International Search Report and Written Opinion in PCT/US2013/060244, dated Feb. 4, 2014, 16 pages.

Non-Final Office Action dated Aug. 13, 2014 in U.S. Appl. No. 13/647,116, 29 pages.

Final Office Action dated Dec. 9, 2014 in U.S. Appl. No. 13/360,876, 21 pages.

Second Written Opinion of the International Searching Authority dated Dec. 19, 2014 in Application No. PCT/US2013/074742, 10 pages.

Notice of Allowance dated Mar. 4, 2015 in U.S. Appl. No. 13/647,116, 9 pages.

International Preliminary Report on Patentability for International Patent Application No. PCT/US2013/074742, dated Mar. 23, 2015, Filed Date: Dec. 12, 2013, 18 Pages.

(56) References Cited

OTHER PUBLICATIONS

Non-Final Office Action dated May 21, 2015 in U.S. Appl. No. 13/715,273, 12 pages.
Supplementary Search Report Issued in European Patent Application No. 13743254.8, dated May 29, 2015, 5 Pages.
StruxureWareTM Data Center Operation, Retrieved on: Jul. 4, 2014, Available at: http://www2.schneider-electric.com/documents/solutions/struxureware/StruxureWare-data-center-operation_RMCR-8N2PLE_R7_EN.pdf.
International Search Report & Written Opinion Issued in Application No. PCT/US2015/051291, dated Oct. 23, 2015, 13 Pages.
Notice of Allowance dated Jan. 14, 2016 in U.S. Appl. No. 13/715,273, 5 pages.
Non-Final Office Action dated Jun. 9, 2016 in U.S. Appl. No. 13/360,876, 23 pages.
Notice of Allowance dated Dec. 16, 2016 in U.S. Appl. No. 13/360,876, 20 pages.
Non-Final Office Action dated Jan. 26, 2017 in U.S. Appl. No. 14/496,889, 16 pages.
Notice of Allowance dated Jun. 30, 2017 in U.S. Appl. No. 14/496,869, 16 pages.
"First Office Action and Search Report Issued in Chinese Patent Application No. 201380032832.5", dated May 24, 2017, 11 Pages.
"Second Office Action Issued in Chinese Patent Application No. 201380032832.5", dated Nov. 6, 2017, 6 Pages.
"Office Action Issued in European Patent Application No. 13734578.1", dated Mar. 9, 2018, 6 Pages.
"Third Office Action Issued in Chinese Patent Application No. 201380032832.5", dated May 4, 2018, 8 Pages.

* cited by examiner

ESTABLISHING AN INITIAL CONFIGURATION OF A HARDWARE INVENTORY

CROSS-REFERENCE TO RELATED APPLICATIONS

This application is related in subject matter to U.S. patent application Ser. No. 13/360,876, filed Jan. 30, 2012, now pending, entitled "AUTOMATED BUILD-OUT OF A CLOUD-COMPUTING STAMP," herein incorporated by reference.

BACKGROUND

Generally, distributed service applications are hosted in cloud-computing networks (across various nodes) and are intended primarily to promote high availability through redundancy of service-application components, dynamic scalability, and auto-healing functionality. These service applications are often divided into portions that include a group of service-application components. These service-application components may be hosted throughout nodes (e.g., physical machines and virtual machines) of one or more data centers. Often, there exists a need to create or expand the computing/storage capacity of these data centers to accommodate usage demands of the service applications and to help ensure that an entire service application does not become unavailable due to a lack of support from the underlying hardware.

Expansion of the data centers may involve various scenarios, such as configuring a new set of hardware or reconfiguring an existing set of hardware to operate in concert with the existing nodes within the data centers. In one example, a new set of racks that each accommodates a plurality of blades may be targeted for being integrated within a fabric that interconnects the data center nodes. This fabric helps ensure that the service-application components distributed across the existing nodes and the newly added hardware such as racks, network devices (L2/3 switches, routers, load balancers), power and serial devices, and blades are able to interact as if each service application was running on its own independent computing device.

When conducting an expansion of a data center, the steps for integrating the new set of hardware into the fabric are presently manually conducted. These manually conducted steps are often time-consuming, ineffective, and inconsistent in result, thus, potentially leading to service interruptions within the fabric. Accordingly, an automated end-to-end process that builds out a set of designated hardware for deployment into a fabric would help achieve an efficient, robust, and scalable framework for expanding the computing/storage capacity of a data center.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for carrying out an automated bootstrap process that verifies a physical topology of an inventory of nonconfigured hardware and integrates/deploys the hardware inventory as a fabric-computing cluster (FCC) within a cloud-computing fabric of a data center. The automated manner in which the bootstrap process is implemented avoids the problematic fallout (discussed above) that precipitates from manually executed procedures for reconfiguring or adding capacity to a data center. Accordingly, in embodiments of the present invention, the automated bootstrap process enables building out the hardware inventory and incorporating it into the cloud-computing fabric in a consistent and effective fashion.

In general, the bootstrap process is triggered upon receiving an indication to create or expand computing/storage capacity of a data center. In embodiments, the data center includes a plurality of nodes (e.g., physical machines or virtual machines), network devices, serial devices, power devices, and other equipment that are operably interconnected and managed via the cloud-computing fabric. The fabric provides underlying support for service applications that are distributed throughout the data centers. In particular, portions (e.g., roles instances or program components) of these service applications that are distributed throughout nodes may be managed by a controller of the fabric. The fabric controller is generally responsible for various duties surrounding the monitoring, maintenance and management of the health of computer resources, network gear, serial devices, and power units that support the underlying functionality of the fabric.

In an exemplary embodiment, the bootstrap process is performed in independent phases upon being triggered by an event (e.g., call to expand capacity of the data center). These phases are carried out by executing self-contained workflows, respectively, and are generally depicted at FIG. 2. Initially, a coauthoring phase may be conducted for specifying an initial set-up of an inventory of hardware. This phase involves a workflow for implementing one or more of the following processes: receiving a customer's dependency schema that specifies the additional capacity required on the customer's premises; identifying the hardware that meets the dependency schema; interfacing with the customer to gather values for configuring the identified hardware; generating a symbolic representation from the values; validating configuration using the symbolic representation upon delivery of the hardware; and preparing a template file that memorializes a layout of the topology.

Upon preparing the template file, the phases that involve discovery and validation of network devices and hardware devices may be commenced. The workflows for performing discovery and validation for each of these devices generally involve user device(s) that communicate with the network devices via network-based connection and/or a serial-based connection to discover a physical topology (e.g., inter-rack locations and a wiring arrangement) surrounding the hardware devices. These user device(s) may cross-reference the discovered physical topology against the template file in order to validate the hardware devices. Once the topology physical/logical configuration is fully generated, the deployment of a new fabric instance, or the expansion of an existing fabric instance can commence.

Next, the user device(s) may initiate communication with a cloud-computing fabric of a data center in order to effectuate the phases that deploy the hardware inventory within the fabric of the data center as a fabric-computing cluster (FCC) and provision security on the FCC. These phases involve various workflows that support setting up the hardware cluster to interact with resources and existing hardware within the data center. In addition, these workflows may include the following steps: preparing an infrastructure state from information gathered upon verifying the physical topology of the hardware inventory; integrating the hardware inventory within the fabric of the data center by sharing the infrastructure state with a fabric controller; deploying services running on the fabric within the hardware inventory; and designating the hardware inventory as a data center FCC. Accordingly, when carried out in succession, these phases of the bootstrap process promote end-to-end automation for building out a hardware inventory and for integrating the hardware inventory within a fabric of a datacenter. This end-to-end automation may further achieve an efficient, robust, and scalable framework either within the hardware inventory preestablished within the datacenter (e.g., reconfiguring an existing FCC to represent a new FCC instance within the datacenter), or at a site external to the datacenter (e.g., integrating a remote hardware inventory as a new FCC instance within the datacenter).

BRIEF DESCRIPTION OF THE DRAWINGS

Embodiments of the present invention are described in detail below with reference to the attached drawing figures, wherein.

DETAILED DESCRIPTION

Figure 1:
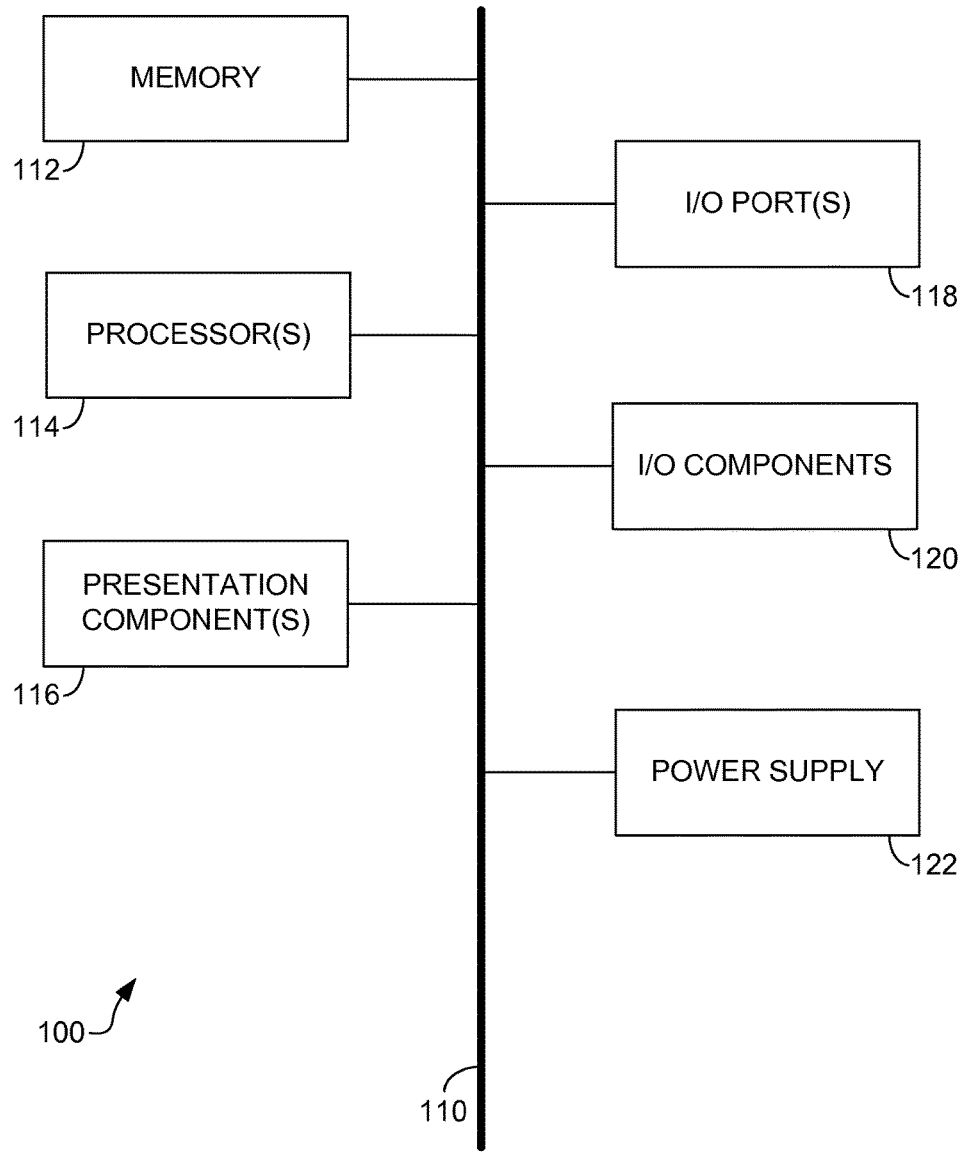
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Generally, embodiments of this invention introduce technology within a cloud-computing fabric to automatically merge an unrefined set or inventory of hardware with a datacenter by employing a bootstrap process. As used herein, the phase "hardware inventory" is not meant to be limited to any particular configuration of components, but broadly refers to any compilation of devices (e.g., network devices, computing devices, and power-supply devices) that may be eventually integrated within the fabric. In one instance, the hardware inventory may be located within a private enterprise network managed by a customer of a cloud-computing-network service provider, where implementing the bootstrap process as an appliance on this type of hardware inventory allows for remote reachability between the data center and the private enterprise network. In another instance, the hardware inventory may be located within the data center managed by the cloud-computing-network service provider, where implementing the bootstrap process allows for building out local storage/computing capacity of the data center.

As will be discussed more fully below, the bootstrap process features end-to-end automation using one or more workflow engines that drive the orchestration and execution of various phases comprising the bootstrap process. In embodiments, these phases can be carried out as independent workflows such that each phase may be invoked and driven to completion separately without reliance on concurrent operation of another phase or workflow. By allowing the phases to be carried out independently in a self-contained manner, each phase consistently delivers incremental improvements to hardware inventory without any adverse interactions of previous or subsequent workflows.

In one aspect of the present invention, computer-readable media is provided, where the computer-readable media includes computer-executable instructions embodied thereon that, when executed, perform a method for selecting an inventory of hardware from specifications of a customer. In embodiments, the method involves receiving a dependency schema that describes additional storage or computing capacity for use by the customer. Typically, the dependency schema specifies logical artifacts and device parameters for requisitioning the additional capacity. The method may further involve automatically selecting from a set of stock-keeping units (SKUs) based on, in part, information received within the dependency schema. In one instance, the SKUs identify predefined hardware clusters, respectively, that are capable of being integrated within a cloud-computing network.

In embodiments, the process of automatically selecting an appropriate SKU from set of SKUs includes, at least, the following steps: using the logical artifacts to designate a network configuration that is supported by one or more of the predefined hardware clusters; and using the device parameters to designate network resources that are included within the predefined hardware cluster(s). The process of automatically selecting the appropriate SKU may further include the step of picking the appropriate SKU from the set of SKUs, where the appropriate SKU generally identifies a hardware inventory from the predefined hardware cluster(s). In operation, the hardware inventory is equipped to support the designated network configuration and includes the designated network resources.

In other embodiments, the method is designed to derive a cluster-configuration file from the SKU, where the cluster-configuration file includes abstract symbolic representations that solicit feedback from a build-out operator. Upon soliciting the feedback from the build-out operator, feedback that addresses the abstract symbolic representations is received at a service provider. Typically, the feedback comprises network-topology values. Next, the cluster-configuration file may be updated by incorporating the network-topology values thereto. Functionally, the updated cluster-configuration file is employed to validate the identified hardware inventory.

In a further aspect of the present invention, a computerized method for determining a topology of an inventory of hardware may be carried out by carried out by one or more processing devices. Initially, the computerized method involves accessing specifications for selecting the hardware inventory from a set of predefined hardware clusters. Typically, the specifications are based on, in part, preferences manually submitted by a user and are based on, in part, system characteristics automatically derived from the manually submitted preferences. A cluster-configuration file may be generated as a function of the manually submitted preferences in conjunction with the automatically derived system characteristics.

The computerized method may further involves the steps of using the cluster-configuration file to request network-topology values from the user and generating a template file that describes the topology of the hardware inventory. In one instance, the template file is generated from the network-topology values in conjunction with information read from the cluster-configuration file. Typically, generating the template file comprises employing a naming-convention mapping to convert the network-topology values into concrete identifiers of components within a virtual local area network (VLAN). As used herein, the phrase "naming-convention mapping" generally represents a tool for maintaining and/or accessing an association between the network-topology values and the concrete identifiers of components within the VLAN. In operation, the template file may be used to allocate hardware assets and logical assets for configuring the hardware inventory.

Once the hardware assets and the logical assets are allocated for configuring the hardware inventory, the computerized method may further involve verifying the identity/configuration of the allocated hardware assets and the allocated logical assets using the template file. In particular embodiments, the process of verifying the assets comprises assigning IP address ranges to the logical assets, and programming the hardware assets with the assigned IP address ranges. In other embodiments, the computerized method may yet involve conducting a discovery of the hardware inventory using the template file. Generally, as discussed more fully below, conducting the discovery includes identifying MAC addresses provided to the hardware assets and the logical assets, as well as updating the template file with the identified MAC addresses.

In yet another aspect of the present invention, a computer system is provided for performing a method that establishes a hardware inventory from various specifications. The computer system includes one or more servers coupled to computer storage media, where the computer storage media includes a plurality of computer software components executable by the server(s). Initially, the computer software components include, at least, a first build-out mechanism and a second build-out mechanism. The first build-out mechanism is configured to generate a cluster-configuration file using externally contributed customer-specified specifications and internally generated platform-specific specifications that are based, in part, on the customer-specified specifications.

In an exemplary embodiment, the process of generating the cluster-configuration file comprises: using the customer-specified specifications and the platform-specific specifications to select a hardware inventory from a set of predefined hardware clusters; deriving the cluster-configuration file from data held within a SKU that describes the selected hardware inventory; and populating the cluster-configuration file with abstract symbolic representations that serve as placeholders for expected values that are missing. In operation, the abstract symbolic representations act to solicit network-topology values from the customer. The second build-out mechanism generates a template file by using a naming-convention mapping to convert the network-topology values into concrete identifiers of components within a VLAN. Also, the build-out mechanism may generate the template file using the network-topology values and information extracted from the cluster-configuration file.

Having briefly described an overview of embodiments of the present invention, an exemplary operating environment suitable for implementing embodiments of the present invention is described below.

Operating Environment

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Phases of the Bootstrap Process

Figure 2:
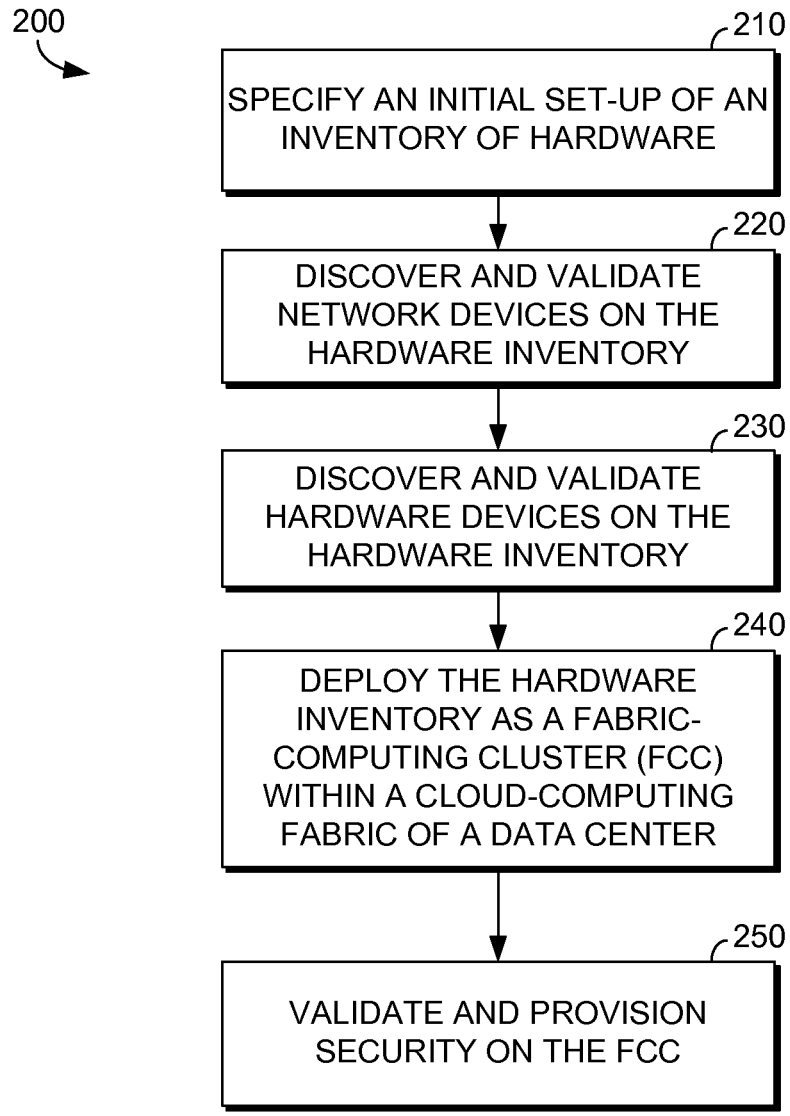
FIG. 2 is a flow diagram showing exemplary phases of a bootstrap process for incorporating an inventory of hardware into a cloud-computing fabric of a datacenter, in accordance with an embodiment of the present invention.

The individual phases of the bootstrap process for establishing interoperation between an inventory of hardware and a cloud-computing fabric of a data center will now be discussed with reference to FIG. 2. Generally, FIG. 2 illustrates a flow diagram 200 that shows five exemplary phases of a bootstrap process for incorporating the hardware inventory into the fabric of a data center, in accordance with an embodiment of the present invention. In embodiments, building out the hardware inventory as a fabric-computing cluster (FCC) using the phases discussed below may be carried out by a configuration software (see reference numerals 321 and 322 of FIG. 3) on a user device or server (see reference numeral 320 of FIG. 3). The server along with the hardware inventory, data center, and/or other network device act in concert to form various ecosystems that each implement one or more phases of the bootstrap process.

Returning to FIG. 2, as depicted at block 210, the first phase of the bootstrap process includes a workflow for specifying an initial set-up of the hardware inventory. Generally, the workflow results in generating the logical/physical configuration needed to deploy the fabric network between blocks 230 and 240. During the first phase, the workflow may involve gaining an understanding about an initial configuration of the hardware inventory before releasing the hardware inventory as an FCC of the data center. For instance, the first-phase workflow may attempt to validate the initial configuration of the hardware inventory to ensure it corresponds with an expected hardware layout (e.g., device locations, IP addresses, VLANs, and wiring) and to ensure it meets certain regulations enforced by the data center (e.g., flagged unsecure components are absent and desirable communication components are present).

In an exemplary embodiment, the workflow of the first phase is concerned with verifying that the initial logical resources and the appropriate specification of those resources matches a supported configuration. One instance of verifying may involve determining whether there sufficient network resources (e.g., IP addresses, VLANs, ports, and the like) provided in the configuration to match the desired configuration articulated by the specification. For example, the first-phase workflow may verify that at least one IP address is provided per machine if such a condition exists within the specification.

Another instance of verifying may involve determining whether there exists an overlap of the configuration with known existing ranges (e.g. accidentally provided resources that are presently in use). Yet another instance of verifying may involve determining whether the planned set of resources constitute a supported configuration (e.g., are there enough of each required resource to meet the specification, is the combination of these type of resources supported, is the detected TOR switch compatible with the detected blades). In still another instance of verifying involves determining whether interaction with the end-user/customer is needed to gather resources required for the execution (e.g., passwords, addresses, IP blocks, VLANs, and the like).

As depicted at block 220, a second phase for discovering, validating network devices, and wiring checks may be implemented on the hardware inventory. In embodiments, the workflow of the second phase may involve communicating with a top-of-rack (TOR) switch and a serial-access device of the network devices via a serial-based connection and a network-based connection, respectively. Further, the second-phase workflow may involve sending instructions over one or more of the connections that prompt the TOR switch and/or the serial-access device to selectively induce hardware devices (e.g., processors, processing units, computing devices, servers, and blades inserted into a rack) to send traffic to the user device for analysis and may involve the use of a power distribution unit (PDU) to selectively power-cycle the devices to reset their state. This analysis may include discovering and validating the hardware devices, as depicted at block 230. That is, the third phase of the bootstrap process employs data packets that are carried from the hardware devices to the user device. A workflow of the third phase may involve parsing the content (e.g., payload and header) of the data packets to determine the location or absence of, configuration of, and internal connections to the hardware devices.

In embodiments, the third-phase workflow may also send specific workflows, tools, etc. to the various devices and/or blades to perform validation, update and/or configuration of hardware and/or software components (e.g., BIOS and device firmware) within the devices/blades themselves. In other embodiments, the workflow of the third phase may execute "smoke tests," which serve to verify components with the devices/blades are functional and meet the fabric requirements. Further, the third-phase workflow may identify the model, manufacturer, and firmware version of devices/blades for recordation and eventual use.

As depicted at block 240, the fourth phase of the bootstrap process involves deploying the inventory as an FCC instance within the fabric of the data center. In an exemplary embodiment, the fourth-phase workflow may involve sharing with the fabric an infrastructure state of the hardware inventory (e.g., generated during at least one of the previous phases) and installing services on the hardware inventory that allow for interaction with the fabric. Installing services onto the hardware inventory may correspond with one of multiple scenarios, which are discussed in the paragraph below. As depicted at block 250, the fifth phase of the bootstrap process involves cluster-wide validation and provisioning of the security measures on the hardware inventory once it is designated as an FCC instance. In an exemplary embodiment, the fifth-phase workflow may involve passing data (e.g., device credentials, original certificates, private keys, and passwords) between a secret store associated with the new FCC instance and a controller of the fabric.

Although five distinct phases of the bootstrap process have been described, it should be understood and appreciated that other types of suitable arrangements of workflows that help advance the incorporation of the hardware inventory within a fabric of a data center may be used, and that embodiments of the present invention are not limited to the five phases described herein. For instance, embodiments of the present invention contemplate dividing a workflow of an individual phase (e.g., phase five) into separate workflows (e.g., cluster-wide validation and security provisioning) that can be performed in a mutually-exclusive fashion.

Examples of the multiple scenarios for installing services onto the hardware inventory will now be described. In one scenario, the hardware inventory represents equipment that is new to the data center and that is not previously configured. Accordingly, the new hardware is configured to operate transparently with existing resources of the data center and is cleanly integrated within the data center as a new FCC instance or cloud-computing stamp that is managed by a controller of the cloud-computing fabric.

In another scenario, the hardware inventory represents a local extension of the data center that is added upon the data center requesting additional storage/computing capacity. The local extension may include a rack of blades that build out to allow for management by a fabric controller. In embodiments, the process of building out involves discovering a wiring pattern of the blades within the rack, validating the wiring pattern against a predefined template file, and approving the blades for incorporation into the data center. In effect, building out the blades helps to ensure that any latent wiring issues or hardware issues (e.g., physical defects missing parts, invalid versions of parts, or improper configuration) within the rack are detected and addressed, thereby ensuring that incorporation of the blades within the data center will not adversely impact the live underlying support being offered by the data center to services running thereon.

In yet another scenario, the hardware inventory is configured with its own instance of a cloud-computing fabric that is separate and partitioned from the fabric currently intercoupling resources of the data center. Thus, upon incorporation of the hardware inventory into the data center, the data center will run at least two cloud-computing fabrics (e.g., operating systems) that function to isolate services assigned to the newly bootstrapped hardware inventory from services assigned to the original data center. In this way, separate fabrics may be dedicated to services of particular customers, thereby virtually and physically excluding/protecting some services from others within the data center (e.g., build-out/bootstrap in a data center container).

In still another scenario, referred to as a return manufacture authorization (RMA) scenario, the hardware inventory represents computing device(s) or other devices (e.g., network, PDU, and serial) that are deemed unreachable (e.g., inoperable or disconnected) by the controller of the fabric of the data center (hereinafter "fabric controller"). During lifecycle management of hardware, the fabric controller may periodically solicit a status of computing devices (e.g., physical machines and/or virtual machines) aggregated within the data center. Soliciting the status may involve communicating requests to agents running on the computing devices, respectively, and receiving health information in return. If the fabric controller is unable to reach a particular computing device for any reason (e.g., a network device that interconnects the computing device to the fabric controller fails), the fabric controller can raise an alert that indicates the hardware inventory is unreachable.

Upon recognizing the hardware inventory as unreachable, the fabric controller may initiate an auto-healing procedure. In embodiments, the auto-healing procedure includes at least the steps of evacuation and validation, where validation is often carried out within one or more phases of the bootstrap process as well. The step of evacuation may involve transferring services (e.g., customer-owned applications and system-based applications) consuming resources on the unreachable hardware inventory to a replacement hardware inventory. As such, evacuation ensures that the auto-healing procedure is transparent to the customers of the data center because the visibility to their services is not impacted during validation, and maintenance.

Once the evacuation is successfully performed, the step of validation is invoked. In an exemplary embodiment, the step of validation includes carrying out a workflow of the bootstrap process that verifies configuration settings of components residing within the unreachable hardware inventory and cross-references a detected physical topology (e.g., links between components and wiring between devices) of the unreachable hardware inventory against an expected physical topology (e.g., provided within the template file) of the unreachable hardware inventory. As such, the step of validation determines whether the unreachable hardware inventory is properly configured to interact with drivers of the fabric controller, where the drivers are designed to interact with specific hardware configurations.

As more fully discussed below, the step of validation involves taking the unreachable hardware inventory offline, which is the reason for conducting the step of evacuation beforehand. Generally, the unreachable hardware inventory is taken offline because several destructive actions occur that would interrupt the execution of services on devices of the unreachable hardware inventory and/or on devices of the data center. These destructive actions may include one or more of the following: manipulating a flow of power (e.g., turning on and off) to a blade by requesting a serial-access device to selectively drive a power (via a PDU) thereto; gathering information from traffic sent from the manipulated blade; extracting information (e.g., MAC address of the blade) from content of data packets sent within the traffic; and verifying the location and wiring of the blade by evaluating the extracted information against the template file and performing validations. It should be noted that the serial-access device is typically used for out-of-band communication, while the TOR switch employs in-band communication (e.g., via the Ethernet).

In an example of selectively driving power to the blade, the fabric controller may turn off power to a range of ports that feed the blades of the unknown/invalid hardware inventory. Next, the fabric controller may directly or indirectly instruct the PDU to turn on power to a selected port that links to a subject blade. The fabric controller may then read the MAC address from data packets being sent from the subject blade that is currently sending traffic. Thus, connectivity of the subject blade is verified when the selected port corresponds with an expected port of the template file. Beyond verifying the selected port for receiving power from the PDU, the step of validation may further involve a TOR switch that can determine which port—within a range of ports allocated to the blades of the unknown hardware inventory—is connected to the subject blade. This determination is made by identifying a subject port of the port range that is receiving the data packets being delivered from the subject blade.

Architecture of a System for Implementing the Coauthoring Phase

In general, various phases within a bootstrap process are employed to achieve an efficient, robust, and scalable framework to incorporate a cloud operating system on designated hardware regardless of the location. Accordingly, aspects of the present invention are directed toward the configuration-authoring phase (hereinafter "coauthoring phase") for building up a non-configured hardware inventory into a data center stamp, which is ultimately incorporated into the fabric of the cloud-computing platform. As more fully discussed below, building up the non-configured hardware inventory involves one or more of the following steps: receiving a customer's specifications for requisitioning new or additional hardware inventory; supplementing the customer's specifications with automatically generated parameters; packaging the customer's specifications and the parameters into a predefined identifier (e.g., SKU); developing a cluster-configuration file from information within the SKU; using symbolic representations of network configurations within the cluster-configuration file to ensure a person/team can easily understand requirements; and conducting network validation by separating verification into physical concepts and logical concepts.

The architecture of a system that is capable of discovering, validating, and configuring network and hardware devices within an inventory of hardware will now be discussed with reference to FIG. 3. Generally, FIG. 3 depicts a graphical representation illustrating an exemplary system architecture 300 for implementing the coauthoring phase when establishing and validating a topology of the inventory of hardware, where the system architecture 300 is suitable for use in implementing embodiments of the present invention.

Figure 3:
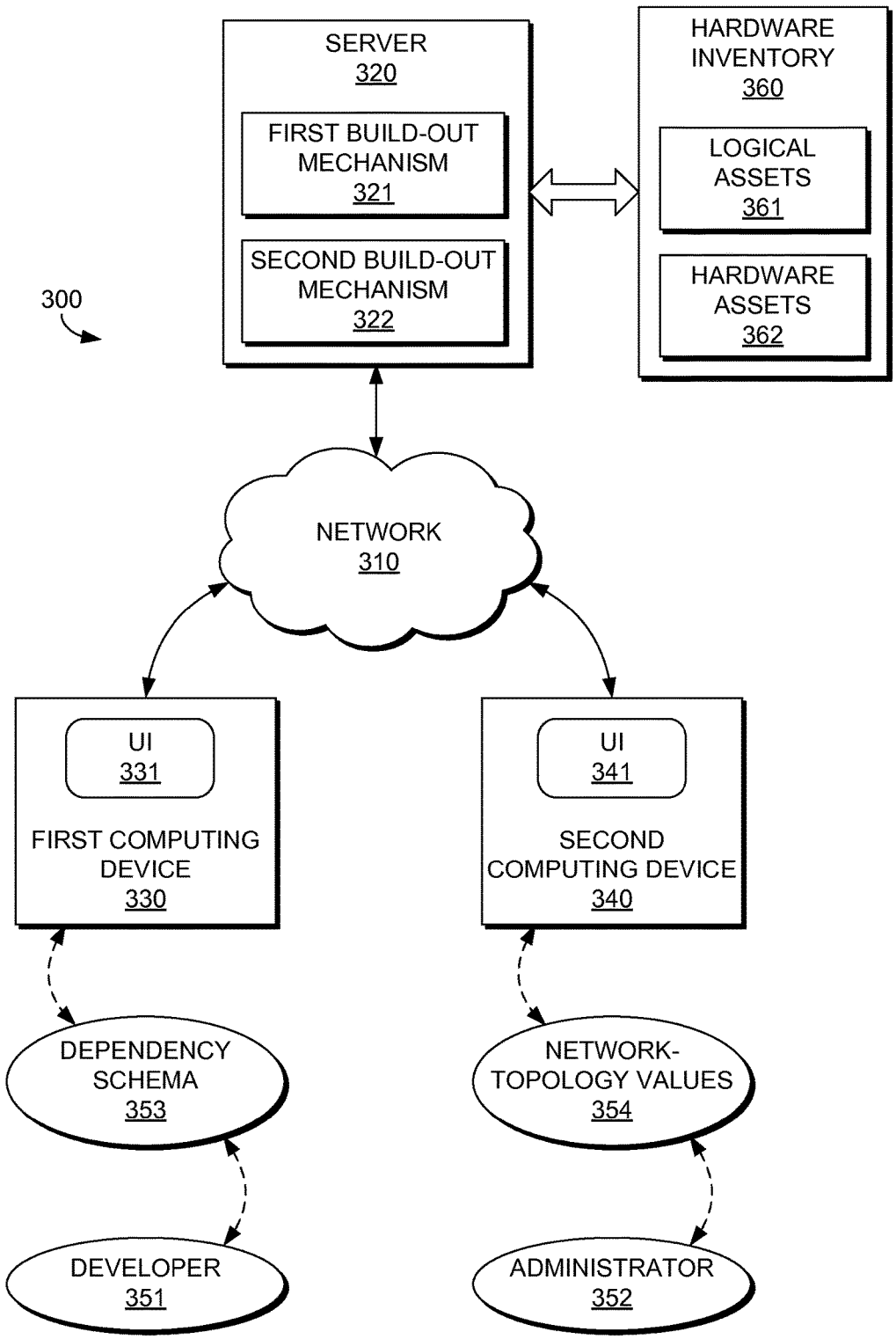
FIG. 3 is a graphical representation illustrating an exemplary system architecture for coauthoring a topology of an inventory of hardware, the system architecture being suitable for use in implementing embodiments of the present invention.

It will be understood and appreciated by those of ordinary skill in the art that the system architecture 300 shown in FIG. 3 is merely an example of one suitable portion of an environment for carrying out the coauthoring phase of the bootstrap process and is not intended to suggest any limitation as to the scope of use or functionality of embodiments of the present invention. Neither should the system architecture 300 be interpreted as having any dependency or requirement related to any single resource or combination of resources illustrated therein. Further, although the various blocks of FIG. 3 are shown with lines for the sake of clarity, in reality, delineating various components is not so clear, and metaphorically, the lines would more accurately be grey and fuzzy.

The hardware inventory 360 includes various equipment/resources that are internally interconnected and externally coupled with a server 320 via serial-based connections and/or network-based connections. Although a single server 320 is illustrated in FIG. 3, the server 320 may represent a group of servers acting in cooperation (i.e., cloud-computing network) or other computing device(s). These equipment/resources, as described herein, may include software components (e.g., logical assets 361 installed in the network devices) as well as tangible hardware elements (e.g., hardware assets 362 such as racks with blades or computing devices residing thereon). In embodiments, the equipment/resources may be distributed across various physical resources; thus, the server 320 may be configured to recognize a location of the equipment/resources through the discovery and validation phases (see reference numerals 220 and 230 of FIG. 2) to establish communication therebetween. In addition, a network 310 may be provided that facilitates this communication over channels connecting the equipment/resources and any other elements required by the bootstrap process. The network may include, without limitation, one or more local area networks (LANs) and/or wide area networks (WANs). Such networking environments are commonplace in offices, enterprise-wide computer networks, intranets, and the Internet. Accordingly, the network is not further described herein.

The exemplary system architecture 300 may include the server 320, a first computing device 330, and a second computing device 340. Each of the server 320 and these devices 330 and 340, shown in FIG. 3, may take the form of various types of computing devices, such as, for example, computing device 100 described above with reference to FIG. 1. By way of example only and not limitation, the server 320 and the devices 330 and 340 may be a personal computer, desktop computer, laptop computer, consumer electronic device, handheld device (e.g., personal digital assistant), various servers, blades, and the like. It should be noted, however, that the invention is not limited to implementation on such computing devices, but may be implemented on any of a variety of different types of computing devices within the scope of embodiments of the present invention.

Typically, each of the server 320 and the devices 330 and 340 include, or is linked to, some form of a computing unit (e.g., central processing unit, microprocessor, etc.) to support operations of the component(s) running thereon (e.g., originating data packets upon receiving a signal or being supplied power). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the server 320 and the devices 330 and 340 to enable each device to perform communication-related processes and other operations.

In another instance, the computing unit may encompass a processor (not shown) coupled to the computer-readable medium accommodated by each of the server 320 and the devices 330 and 340. Generally, the computer-readable medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

Also, beyond processing instructions, the processor may transfer information to and from other resources that are integral to, or disposed on, the server 320 and the devices 330 and 340. Generally, resources refer to software and hardware mechanisms that enable the server 320 and the devices 330 and 340 to perform a particular function. By way of example only, the resources may include one or more of the following mechanisms: a first build-out mechanism 321; a second build-out mechanism 322; and components residing within the computing devices 330 and 340.

In operation, the first build-out mechanism 321 and the second build-out mechanism 322 represent one or more computer software components that are hosted on computer storage media accessible by the server 320. Further, the first build-out mechanism 321 and the second build-out mechanism 322 are executable (jointly or individually) by the server 320 to carry out a method for establishing the hardware inventory 360 from various specifications. The first build-out mechanism 321 is typically configured to generate a cluster-configuration file using externally contributed customer-specified specifications and internally generated platform-specific specifications that are based, in part, on the customer-specified specifications. The externally contributed customer-specified specifications may be provided from a developer 351 in the form of a dependency schema 353, where the dependency schema 353 includes preferences and/or requirements of storage/computing capacity of the hardware inventory 360. It should be noted that the term "developer," as used herein does not necessarily infer the developer of the bootstrap system. For instance, the developer may represent an entirely separate certification entity, which certifies new types of hardware SKUs and clusters. As illustrated, the dependency schema 353 may be electronically submitted by the developer 351 via a user interface (UI) 331 on the first computing device 300. In one instance, electronic submission may involve the developer 351 entering specifications of the dependency schema 353 by selecting from a list of predetermine options, where the selected options are used to identify a SKU that meets the developer's 351 plan for increased capacity.

Figure 4A:
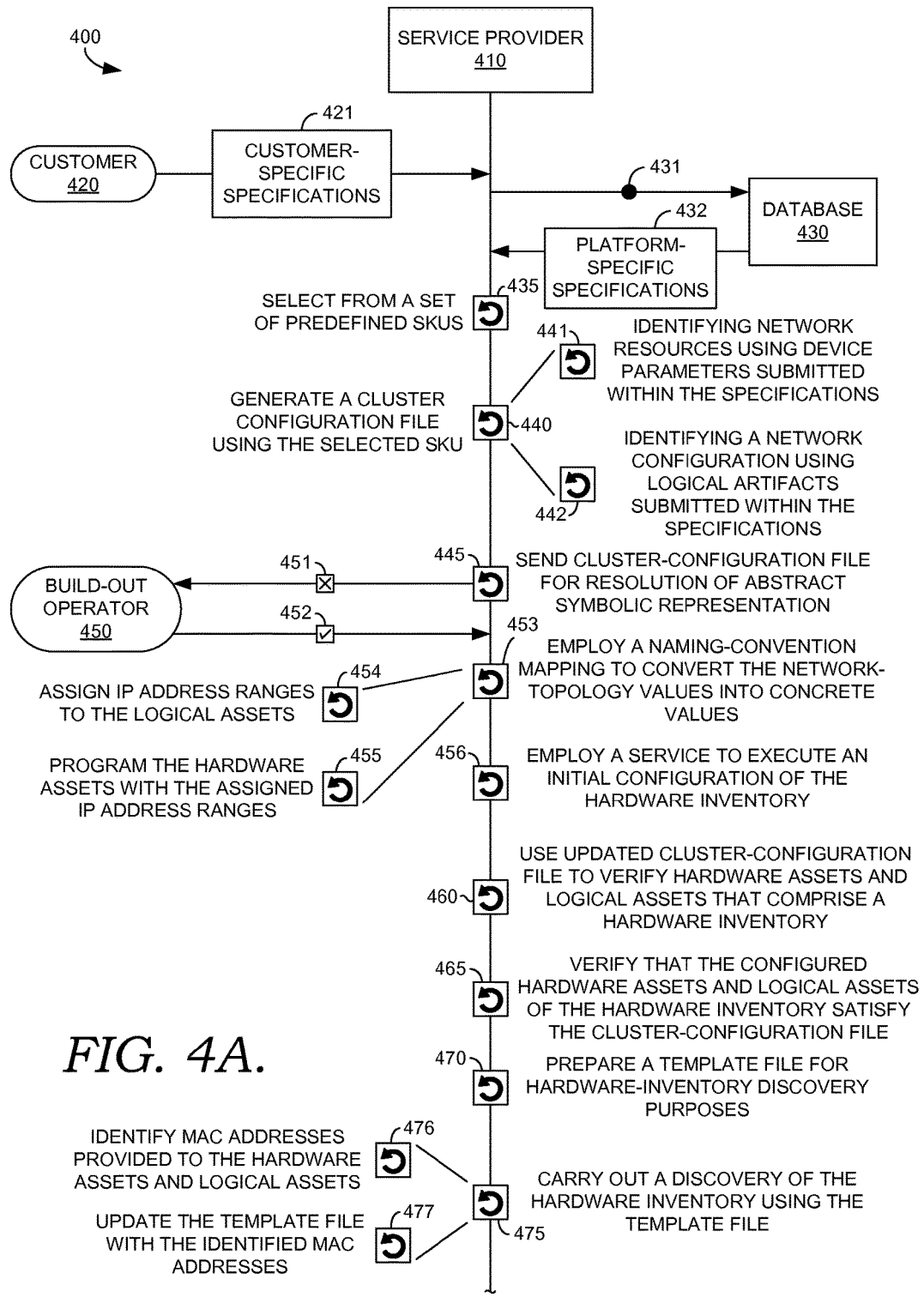
FIGS. 4A and 4B depict an operational flow diagram illustrating an overview of a technique for establishing an initial configuration of a hardware inventory according to one embodiment of the present invention.

As used herein, the expression "SKU" is not meant to be limiting, but may broadly encompass any unique identifier for a distinct product that may be purchased, thereby enabling user(s) (e.g., customer, developer 351, vendors, and service providers 410 of FIG. 4A) to systematically track delivery or product availability. SKUs are assigned to individual items (e.g., configurations of the hardware inventory 360) and typically serialized at the merchant level. For instance, once the developer's 351 specifications identify the appropriate SKU from a predetermined list of options, the SKU may designate network resources (e.g., number of VLANs and size of the VLANs) and a network configuration (e.g., location and interconnection of devices on the rack) that are to be implemented within the hardware inventory 360 as logical assets 361 and hardware assets 362. In another instance, where the developer is expanding upon current storage and/or computing capacity, the selected SKU may serve to describe the number and type of machines to purchase to grow the number of racks or blades presently in use.

Although one configuration of electronic submission of specifications to select an appropriate SKU has been described, it should be understood and appreciated that other types of suitable mechanisms that allow the developer 351 to submit the dependency schema 353 may be used, and that embodiments of the present invention are not limited to the UI 331 described herein. For instance, the specifications may be submitted by simply calling a customer-service agent that manually selects the appropriate SKU based on an overall consideration of the specifications. Further, although the developer 351 and administrator 352 are illustrated as separate individuals, Applicants contemplate these separate contributors as being the same customer or entity.

In operation, the appropriate SKU may be selected, typically from a list of predefined SKUs, and used for generating a cluster-configuration file. As mentioned above, selection involves using the customer-specified specifications and the platform-specific specifications to select a hardware inventory (associated with the SKU) from a set of predefined hardware clusters (associated with the list of predetermined SKUs). Generally, each of the predefined hardware clusters represents compatible configurations of hardware assets and logical assets that have been demonstrated to function congruently. Once the SKU for the selected hardware inventory is known, the first build-out mechanism 321 may derive the cluster-configuration file from data held within a SKU, which describes the selected hardware inventory. Further, the first build-out mechanism 321 may be configured for populating the cluster-configuration file with abstract symbolic representations that serve as placeholders for expected values that are missing. In operation, the abstract symbolic representations act to solicit network-topology values 354 from the customer (e.g., administrator 352) or network devices. In embodiments, the abstract symbolic representations serve as placeholders for fields within the cluster-configuration file that are initially missing expected values. These fields are associated with at least one of names of VLANs, sizes of the VLANs, configurations of the VLAN, IP addresses, or other configuration data not directly available from the SKU definition.

In general, the network-topology values 354 represent information received from the administrator 352 that acts to complete missing attributes within incomplete fields of the cluster-configuration file, where the received information assists in properly configuring the hardware inventory 360. Upon receiving the network-topology values 354 from the customer (e.g., administrator 352) or other sources such as direct discovery from network devices, the second build-out mechanism 322 generates a template file. Generation of the template file may be carried out by using a naming-convention mapping to convert the network-topology values 354 into concrete identifiers of components within a VLAN. Also, the second build-out mechanism 322 may generate the template file using the network-topology values and information extracted from the cluster-configuration file. In operation, as will be discussed more fully below, the template file is employed to allocate and/or configure the logical assets 361 and the hardware assets 362 of the hardware inventory 360.

This exemplary system architecture 300 is but one example of a suitable environment that may be implemented to carry out aspects of the present invention, and is not intended to suggest any limitation as to the scope of use or functionality of the invention. Neither should the illustrated exemplary system architecture 300 be interpreted as having any dependency or requirement relating to any one or combination of the components 321 and 322 as illustrated. In some embodiments, one or more of the components 321 and 322 may be implemented as stand-alone devices. In other embodiments, one or more of the components 321 and 322 may be integrated directly into the computing device(s) 330 or 340, or even the hardware inventory 360. It will be understood by those of ordinary skill in the art that the components 321 and 322 illustrated in FIG. 3 are exemplary in nature and in number and should not be construed as limiting.

Workflow for the Coauthoring Phase

The workflow of the configuration-authoring phase (see block 210 of FIG. 2), which is referred to herein as the "coauthoring phase," facilitates specifying an original set-up of the hardware inventory 360 of FIG. 3 and generates, as a result, a template file that is consulted during discovery and validation. Initially, an original equipment manufacturer (OEM) is expected (e.g., as part of a contract for goods) to verify inter-device wiring prior to shipping a hardware inventory. This could be done by individually invoking the first three phases, depicted at blocks 210, 220, 230 of FIG. 2, of the workflow separately. Further, the OEM is expected to employ tools that provide a manifest describing attributes of software installed within the devices of the hardware inventory. The wiring verification and software-attribute manifest are maintained in association with the hardware inventory for assisting in the selection of an appropriate hardware inventory. In some embodiments, the OEM may set the hardware inventory to a zero configuration.

The next two paragraphs will generally describe the coauthoring phase in a high-level manner, while the subsequent paragraphs in this section of the Specification will particularly describe the coauthoring phase in more detail. Initially, the coauthoring-phase workflow involves an order for a hardware inventory that is initiated automatically or manually by a customer to remedy a storage/computing capacity deficiency. In one instance, initiating the order involves generating a form (e.g., XML document) with nonspecific data surrounding a set of equipment (e.g., devices, racks, and software) targeted to fulfill the capacity deficiency. This form is used to select a SKU or other identifier of a particular hardware inventory. The SKU is employed to generate a form (e.g., cluster-configuration file) that includes abstract symbolic representations for soliciting preliminary values (e.g., network-topology values) from the customer (e.g., administrator 352 of FIG. 3). The preliminary values may be entered onto the form automatically or manually by the customer, where the preliminary values reflect some data center specific details (e.g., VLAN range, port range, and IP addresses) or a customer-defined topology schema. The topology schema defines a type, quantity, and wiring pattern of the hardware and network devices of the hardware inventory and indicates additional information used for running the devices (e.g., number of racks, VLAN range, number of ports, and supporting resources).

Upon entry of the preliminary values, the form (e.g., cluster-configuration file) may be converted into a template file. Generally the template file serves as a high-level, logical blueprint of equipment (e.g., devices) and the routing (e.g., wiring) therebetween. For example, the template file may indicate which pieces of equipment are grouped within a common VLAN. At some point, the template file may be sent to the OEM, customer, or administrator—based on the scenario—to allocate appropriate logical and hardware assets of a hardware inventory. In one instance, selection of the appropriate assets includes comparing the template file against the wiring verification and/or the software-attribute manifest that is maintained in association with hardware inventories at the OEM. Upon selecting the appropriate assets for the hardware inventory, the hardware inventory may be verified against the template file and/or visually inspected to validate the wiring (e.g., serial and network cable connectivity) of the hardware inventory, and to determine actual values (e.g., port numbers, IP addresses, VLAN membership, and device locations) of the hardware inventory based on the inspection or through automated means.

Figure 4B:
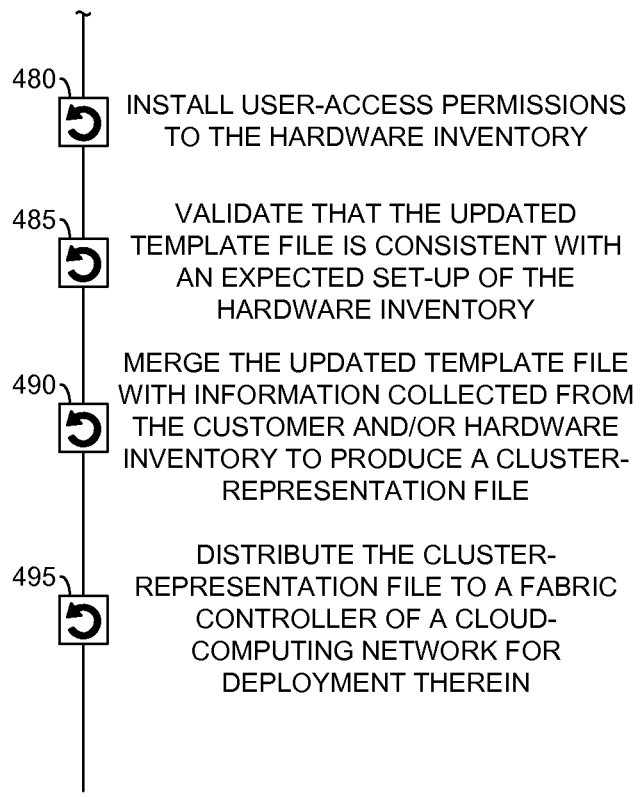

The technique for establishing an initial configuration of a hardware inventory is shown in FIGS. 4A and 4B as an operational flow diagram 400 illustrating an overview of a technique for establishing an initial configuration of a hardware inventory according to one embodiment of the present invention. Initially, a customer 420 may determine that an additional data center or additional data center capacity (e.g., storage and/or computing) is desired to establish or expand a data center, respectively. The customer 420 may provide customer-specific specifications 421 (e.g., dependency schema 353 of FIG. 3) to a service provider 410 via a UI or any other mechanism that acts as a conduit for conveying information.

Upon detecting the arrival of the customer-specific specifications 421, the service provider 410 may send a request 431 to a database 430 for information to supplement the customer-specific specifications 421. In response, the database 430 may return platform-specific specifications 432 that serve to compliment the customer-specific specifications 421, thereby creating efficiencies by focusing the specifications that the customer 420 contributes. As depicted at operation 435, the specifications 421 and 432 are employed to select a SKU from a set of predefined SKUs. In one example, specifications that request additional compute capacity may select an SKU for several machines with larger hard drives. In another example, specifications that request additional processing capacity invoke a SKU for multiple machines. Generally, the set of predefined SKUs identifies a set of predefined hardware clusters, respectively, that have been tested to work together (i.e., proven to be compatible). Advantageously, by allowing the customer 420 to select from one of the predefined set of predefined SKUs, the service provider 410 may offer a limited number of devices (PDUs, network switches, and drivers for communication and management purposes).

In embodiments, the selected SKU may articulate various attributes of a hardware inventory being used for the purpose of running cloud-computing services, such as a predefined connectivity (e.g., wiring diagram), a number of machines and their role in the overall configuration, and a number of resources (e.g., number of LANs, network IDs, and routers). Further, with respect to blades, the selected SKUs may indicate an amount of CPU, an amount of memory, and/or hard drive capacity. (These blade parameters may be later customized based on the specifications 421 and 432 within preestablished limits.) In other embodiments, the selected SKU may define number of schemas (indicating network resources (topology) and software components to install (dependency)) working together.

In other words, the SKU may include information related to physical machines/devices (hereinafter "device parameters") and information related to network/software configurations (hereinafter "logical artifacts"), which are derived from the specifications 421 and 432. As depicted at operation 440, a cluster-configuration file may be abstracted from the information within the selected SKU. In particular instances, abstraction of the cluster-configuration file may involve the following operations: identifying network resources using the device parameters submitted within the specifications 421 and 432 (see operation 441); and identifying a network configuration using the logical artifacts submitted within the specifications 421 and 432 (see operation 442). In this way, the network resources and network configuration are separately determined and may exist individually within the cluster-configuration file.

The cluster-configuration file may be generated with abstract symbolic representations 451 (e.g., symbolic VLAN list), that solicits information for resources that support the internal and external functionality of the hardware inventory. As used herein, the phrase "abstract symbolic representations" generally denotes placeholders that requests actual values of network topology and/or configuration(s) (e.g., VLAN settings) that should be verified on certain devices, thereby enabling those devices to communicate with each other in a manner that fulfills the intent, or logical goal, of the hardware inventory. In one example, the abstract symbolic representations 451 draw from a build-out operator 450 setup-information feedback (e.g., network-topology values 452) for configuring the VLAN to expose outside IP addresses to other networks, thus, promoting accessibility of the hardware inventory being established. Further, the setup-information feedback may describe the size of the VLAN (e.g., number of IP addresses allocated to the hardware inventory). In another example, with respect to compute capacity, the abstract symbolic representations 451 draw from the build-out operator 450 setup-information feedback for identifying the rack-level (L2) and router-level (L3) components for the network switches within or outside the hardware inventory.

When the build-out operator 450 fills in the missing parts of the cluster-configuration file (i.e., satisfies the abstract symbolic representations 451 with network-topologic values 452), in embodiments, there may be no need to provide a specific number of subnet addresses and/or router addresses, as the service provider 410 automatically translates this information into final numbers. That is, the build-out operator 450 may address some missing fields of the cluster-configuration file (i.e., manually specifying external devices, names of shared routers, and wiring information of external devices (e.g., types of serial ports and IP addresses of switches)), while the service provider 410 may automatically address other missing fields of the cluster-configuration file, thereby simplifying the task of the build-out operator 450. Accordingly, the completed cluster configuration file acts to define what hardware is required, the logical purpose for that hardware, and the network configuration (e.g., VLAN settings) that should be installed on that hardware. Further, during the operation 445 in which the cluster-configuration file is sent for resolution of the abstract symbolic representations 451, a separate report may be generated. The report includes a list of missing values related to a number of new subnets and their respective sizes. The intent is for the report to request a list of VLANs needed for configuring the network and to request a concrete number of IP addresses within each VLAN.

As depicted at operation 453, a naming-convention mapping is used to convert the symbolic network-topology values 452 into concrete identifiers of components within the cluster-configuration file. The "naming-convention mapping" represents a map between a value provided for one or more of the symbolic representations and a physical name on the hardware inventory that may be validated. In operation, the service provider 410 uses the naming-convention mapping to translate the network-topology values 452 (e.g., subnet names and device names) from the build-out operator 450 into concrete identifiers. These concrete identifiers allow for configuring devices of the hardware inventory with actual information upon delivery. The actual information may include, but is not limited to, the following: actual IP addresses; naming convention for subnets; cluster IDs for naming VLANs; subnet types; and subnet indexes. These concrete identifiers also allow for automatically allocating IP/VM/MAC and VLAN to the hardware assets and the logical assets, respectively, of the hardware inventory. In one specific instance, the conversion may include translating exemplary network-topology values of VLAN=250 IP addresses: rack 1 gets 10 IP addresses: rack 2 gets 50 IP addresses, etc. into definite, non-intersecting IP address ranges for each of the racks of the hardware inventory. In additional embodiments of the present invention, converting the network-topology values 452 into concrete identifiers of components within the specific cluster configuration may include assigning IP address ranges to the logical assets (see operation 454) and/or programming the hardware assets with the assigned IP address ranges (see operation 455).

Once the appropriate information is supplied to the missing fields of the cluster-configuration file, the completed cluster-configuration file may be used to individually or jointly configure (see operation 456) and/or verify (see operation 460) the hardware assets and the logical assets of the hardware inventory. In general, configuring the logical and hardware assets allows resources available thereto (e.g., high-level network switches) to act in concert with the newly generated VLANs. To this end, the service provider 410 may directly view/configure devices, employ a service that exposes and guides the configuration based on, in part, customer specifications input at the UI, such as intent for or purpose assigned to the hardware inventory or other means that provide the ability to view and modify the configuration of the VLANs.

In embodiments, verifying ensures that the configured hardware inventory meets the parameters in the cluster configuration file. Verifying may include separately verifying the physical hardware assets and the software-based logical assets of the hardware inventory. The process of separately verifying includes, at least the following steps: abstracting various XML files from the cluster-configuration file (e.g., template.XML for verifying the hardware assets and GlobalSettings.XML for verifying the logical assets); using the template.XML to verify the location and connections (e.g., wiring) of the devices within the racks; and using the GlobalSettings.XML to verify the software running within the device, and configuration settings specific for the device or logical grouping of the devices.

Upon conducting the initial configuration and verification, information acquired from the configuration and verification (e.g., VLAN routing entries) is imported or populated into the cluster-configuration file. This updated cluster-configuration file is then used to derive a template file (e.g., racks.XML or cluster.XML) for use in component-discovery purposes, as depicted at operation 470. In embodiments, the template file is employed to program the physical racks of the hardware inventory with the actual configuration setting values (e.g. IP addresses, subnet masks, gateways) that were previously assigned. Accordingly, programming the actual configuration setting values allows the devices within the hardware inventory to function and interact properly. Further, the template file not only includes the actual configuration setting values (e.g. IP addresses) and the devices to which they are assigned, but a list of the devices and how they are wired together (i.e., network configuration of the hardware inventory).

In operation, the template file serves as a template to carry out discovery of the hardware inventory, as depicted at operation 475. Generally, discovery involves network set-up information from the devices of the hardware inventory, where the network set-up information (e.g., which IP addresses are assigned to which VLANs, which machine tools are installed, load-balancing rules, and routing rules) is eventually employed to properly manage the hardware inventory. Discovery may involve the following operations:

assigning MAC addresses to the logical assets (e.g., using an allocation map); identifying MAC addresses provided to the hardware assets (see operation 476); and updating the template file with the identified MAC addresses (see operation 477). Discovery may involve other operations: identifying wiring between certain devices, identifying the logical or physical configuration of the devices and other information which may be missing from the template file.

Before and/or after running the discovery of the hardware inventory, the service provider may install user-access permissions to the hardware inventory. Installing these permissions may entail creating or updating an access control list (ACL) within devices (e.g., top-of-rack switches), where the ACL provides a list of permissions attached to components, respectively. In a specific instance, the ACL specifies which users or system processes are granted access to objects, as well as which operations are allowed on given objects.

As depicted at operation 485, the service provider may validate that the updated template file is consistent with an expected set-up of the hardware inventory. Validation may initially involve, upon completing discovery, merging the information collected during discovery (e.g., settings and locations) into the template file to create an updated template file, or "cluster-representation file" (e.g., datacenter.XML), which describes an entire data center while discarding any redundant information and linking the other files together, as depicted at operation 490. Thus, the template file is used to generate the cluster-representation file along with information concerning the discovery of new devices (e.g. any previously discovered devices that are part of current capacity or other discovery processes). The cluster-validation file is subsequently used for integration of the hardware inventory. Validation may also involve confirming that physical and logical configuration of the new inventory does not conflict with the physical or logical configuration of some of the existing inventory (e.g. duplicated MAC addresses, conflicting IP addresses, etc.). Other potential validations envisioned, but not limited to, are validations of global settings, asset identifiers, cross-datacenter routing configuration.

The cluster-validation file may be output to, and consumed by, a Fabric Controller within a data center when deploying the hardware inventory as an asset to the cloud-computing network, as depicted at operation 495. In one instance, the datacenter.XML is propagated to the appropriate components of the cloud-computing network in order to achieve a complete build-out. In another instance, the datacenter.XML is used to deploy a Fabric Controller within the data center in order to add the hardware inventory as an instance to the data center, where the Fabric Controller uses some information from the datacenter.XML to promote proper interaction of the new hardware inventory with the existing racks (e.g., load-balancer and/or router settings are extended to consider the new devices of the new hardware inventory).

Process Flows

Figure 5:
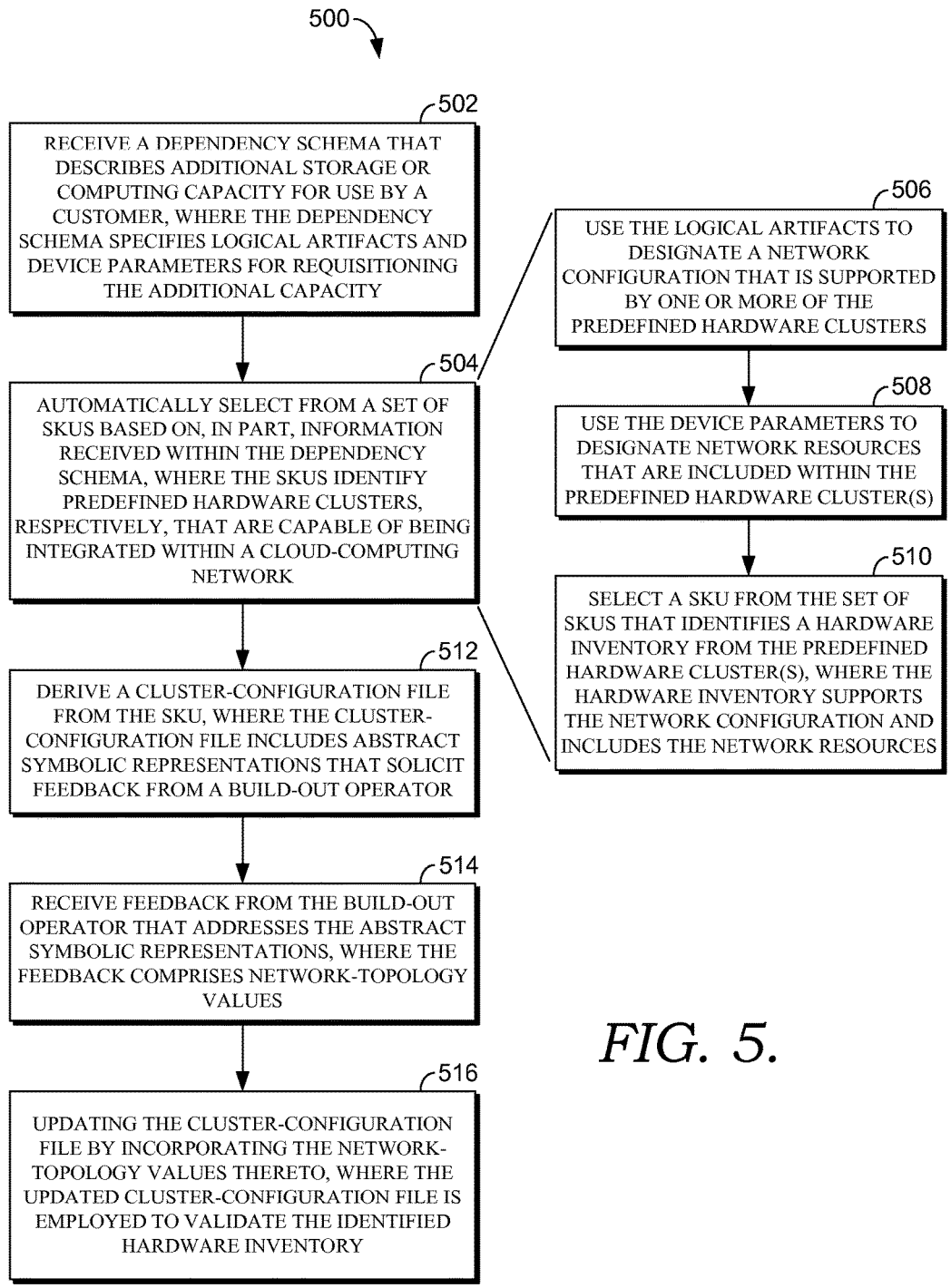
FIG. 5 is a flow diagram showing an overall method for selecting an inventory of hardware from specifications of a customer, in accordance with an embodiment of the present invention.

Referring now to FIG. 5, a flow diagram is shown that illustrates an overall method 500 for selecting an inventory of hardware from specifications of a customer, in accordance with an embodiment of the present invention. Although the terms "step" and/or "block" may be used herein to connote different elements of methods employed, the terms should not be interpreted as implying any particular order among or between various steps herein disclosed unless and except when the order of individual steps is explicitly described. Initially, the hardware inventory represents network and utility devices (e.g., network routers, serial-access aggregators, etc.) and racks, where the rack may include other network and utility devices (e.g., top-of-rack network switch(es), serial-access device(s), power distribution unit(s), etc.) and a set of computing units (e.g., set of blades inserted into the rack).

The method 500, as depicted at block 502, may involve receiving a dependency schema that describes additional storage or computing capacity for use by the customer. Typically, the dependency schema specifies logical artifacts and device parameters for requisitioning the additional capacity. The method 500 may further involve automatically selecting from a set of SKUs based on, in part, information received within the dependency schema, as depicted at block 504. In one instance, the SKUs identify predefined hardware clusters, respectively, that are capable of being integrated within a cloud-computing network.

In embodiments, the process of automatically selecting an appropriate SKU from a set of SKUs includes, at least, the following steps: using the logical artifacts to designate a network configuration that is supported by one or more of the predefined hardware clusters (see block 506); and using the device parameters to designate network resources that are included within the predefined hardware cluster(s) (see block 508). The process of automatically selecting the appropriate SKU may further include the step of picking the appropriate SKU from the set of SKUs, as depicted at block 510, where the appropriate SKU generally identifies a hardware inventory from the predefined hardware configuration(s). In operation, the hardware inventory is equipped to support the designated network configuration and includes the designated network resources.

In other embodiments, the method 500 is designed to derive a cluster-configuration file from the SKU, as depicted at block 512, where the cluster-configuration file includes abstract symbolic representations that solicit feedback from a build-out operator. Upon soliciting the feedback from the build-out operator, feedback that addresses the abstract symbolic representations is received at a service provider, as depicted at block 514. Typically, the feedback comprises network-topology values. As depicted at block 516, the cluster-configuration file may be updated by incorporating the network-topology values thereto. Functionally, the updated cluster-configuration file is employed to validate the identified hardware inventory.

Figure 6:
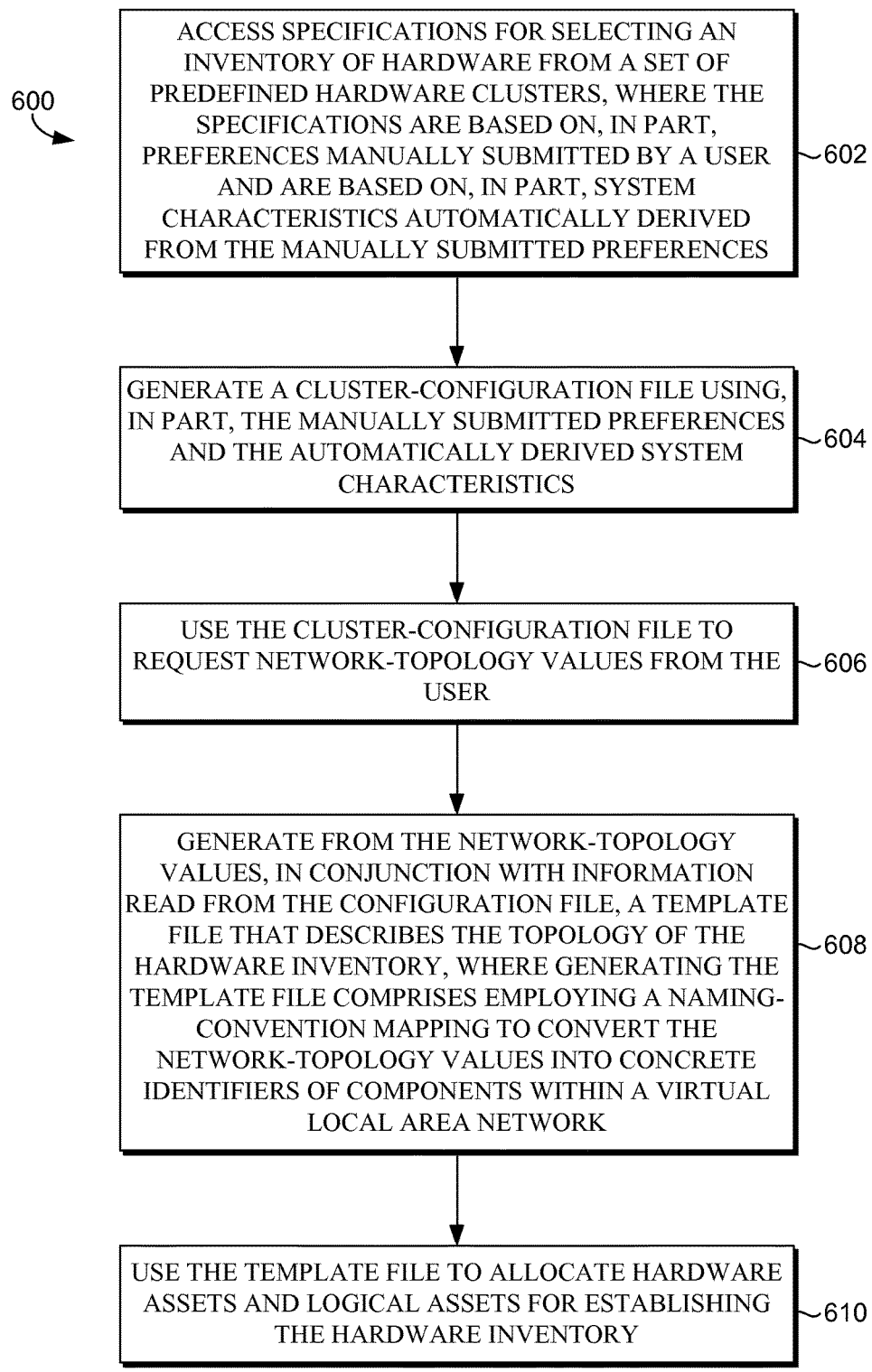
FIG. 6 is a flow diagram showing an overall method for determining an initial topology of an inventory of hardware, in accordance with an embodiment of the present invention.

Turning now to FIG. 6, a flow diagram is shown illustrating an overall method 600 for determining an initial topology of an inventory of hardware, in accordance with an embodiment of the present invention. Initially, as depicted at block 602, the computerized method 600 involves accessing specifications for selecting the hardware inventory from a set of predefined hardware clusters. Typically, the specifications are based on, in part, preferences manually submitted by a user and are based on, in part, system characteristics automatically derived from the manually submitted preferences. A cluster-configuration file may be generated as a function of the manually submitted preferences in conjunction with the automatically derived system characteristics, as depicted at block 604.

The computerized method 600 may further involve the steps of using the cluster-configuration file to request network-topology values from the user (see block 606) and generating a template file that describes the topology of the hardware inventory (see block 608). In one instance, the template file is generated from the network-topology values in conjunction with information read from the cluster-configuration file. Typically, generating the template file comprises employing a naming-convention mapping to convert the network-topology abstract symbolic representations into concrete values of the network-topology configuration settings. As used herein, the phrase "naming-convention mapping" generally represents a tool for maintaining and/or accessing an association between the network-topology abstract symbolic representations and the concrete values of the network-topology configuration settings. In operation, the template file may be used to allocate hardware assets and logical assets for configuring the hardware inventory.

Once the hardware assets and the logical assets are allocated for configuring the hardware inventory, the computerized method 600 may further involve verifying the identity/configuration of the allocated hardware assets and the allocated logical assets using the template file, as depicted at block 610. In particular embodiments, the process of verifying the assets comprises assigning concrete values (e.g., IP address ranges, MAC addresses) to the logical assets, and programming the hardware assets with the assigned values and verifying the presence and proper configuration of the assets. In other embodiments, the computerized method may yet involve conducting a discovery of the hardware inventory using the template file without concrete values for some of the physical or logical configuration. Generally, as discussed more fully below, conducting the discovery includes identifying some characteristics of the hardware assets and the logical assets (e.g., MAC addresses, port names), as well as updating the template file with the identified characteristics.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media memory device having computer-executable instructions embodied thereon that, when executed by one or more processors, perform a method for automatically integrating an inventory of hardware, selected based on specifications of a customer, within a fabric of a data center, the method comprising:

receiving a dependency schema that describes additional storage or computing capacity for use by the customer, wherein the dependency schema specifies logical artifacts and device parameters for requisitioning the additional capacity;

automatically selecting stock-keeping units (SKUs) from a set of SKUs based on, in part, information received within the dependency schema, wherein the SKUs identify predefined hardware clusters respectively, that are capable of being integrated within a cloud-computing network, the predefined hardware clusters represent predetermined compatible configurations of hardware assets and logical assets, and wherein automatically selecting comprises:

using the logical artifacts to designate a network configuration that is supported by one or more of the predefined hardware clusters;

using the device parameters to designate network resources that are included within the one or more of the predefined hardware clusters; and selecting a SKU from the set of SKUs that identifies a hardware inventory from the one or more predefined hardware clusters, wherein the hardware inventory supports the network configuration and includes the network resources, and wherein the identified hardware inventory comprises physical hardware assets, wherein the physical hardware assets comprise one or more of newly added hardware within the data center, a previously existing set of hardware within the data center, or remote hardware that communicates with the datacenter;

deriving a cluster-configuration file from the SKU, wherein the cluster-configuration file includes abstract symbolic representations that solicit feedback from a build-out operator, wherein the abstract symbolic representations serve as placeholders within the cluster-configuration file for expected network-topology values that are missing;

sending the cluster-configuration file to the build-out operator or an automated mechanism for resolution of the abstract symbolic representations;

receiving feedback from the build-out operator or the automated mechanism that addresses the abstract symbolic representations indicating missing network-topology values, wherein the feedback comprises network-topology values;

updating the cluster-configuration file by incorporating the network-topology values thereto;

using the updated cluster-configuration, validating the identified hardware inventory upon delivery of the hardware inventory based on cross-referencing, a discovered topology of the hardware inventory with an expected topology in the updated cluster-configuration file, wherein the discovered topology comprises at least in part device locations and wiring within a rack; and configuring the physical hardware assets with configuration setting values based at least in part on the updated cluster-configuration file, wherein the configuring integrates the physical hardware assets into the fabric of the data center; and controlling interaction between the integrated physical hardware assets and existing hardware by way of the configuring.

2. The computer-storage media of claim 1, wherein the method further comprises gaining access to the hardware inventory.

3. The computer-storage media of claim 2, wherein the method further comprises employing the updated cluster-configuration file to conduct an initial verification of components within the hardware inventory.

4. The computer-storage media of claim 1, wherein the dependency schema includes external specifications indicated by the customer and internal specifications automatically generated as a function of the external specifications.

5. The computer-storage media of claim 1, wherein the selected SKU represents a unique identifier of distinct hardware assets and distinct logical assets, and their respective interaction, of the hardware inventory.

6. The computer-storage media of claim 5, wherein the method further comprises employing a naming-convention mapping to convert the abstract symbolic representations into concrete values of network-topology configuration settings.

7. The computer-storage media of claim 6, wherein the naming-convention mapping represents an association between the abstract symbolic representations and the concrete values of the network-topology configuration settings.

8. The computer-storage media of claim 6, wherein the method further comprises deriving a template file from the concrete identifiers and information read from the cluster-configuration file, wherein the template file describes the topology of the hardware inventory.

9. The computer-storage media of claim 8, wherein the method further comprises using the template file to allocate the hardware assets and the logical assets for configuring the hardware inventory.

10. The computer-storage media of claim 1, wherein each of the predefined hardware clusters represent compatible configurations of hardware assets and logical assets that have been demonstrated to function congruently.

11. The computer-storage media of claim 6, wherein the abstract symbolic representations serve as placeholders for fields within the cluster-configuration file that are initially missing expected values, and wherein the fields are associated with the concrete values of the network-topology configuration settings.

12. The computer-storage media of claim 11, wherein deriving a cluster-configuration file from the SKU comprises generating a report that exposes a list of the expected values that are missing from the cluster-configuration file.

13. The computer-storage media of claim 1, wherein the cluster-configuration file serves to define which devices are included within the hardware inventory and a network configuration of the defined devices.

14. The computer-storage media of claim 8, wherein the method further comprises using the template file to configure the logical assets and the hardware assets of the hardware inventory.

15. The computer-storage media of claim 14, wherein configuring the logical assets and the hardware assets of the hardware inventory comprises:
assigning concrete values to the logical assets;
programming the hardware assets with the assigned concrete values; and
verifying a presence and configuration of the hardware assets.

16. A computer system for performing a method for automatically integrating a hardware inventory within a fabric of a data center from various specifications, the computer system comprising one or more servers coupled to computer storage media, the computer storage media having stored thereon a plurality of computer software components executable by the one or more servers, the computer software components comprising:
a first build-out mechanism software component that generates a cluster-configuration file using externally contributed customer-specified specifications and internally generated platform-specific specifications that are based, in part, on the customer-specified specifications, wherein generating the cluster-configuration file comprises:
using the customer-specified specifications and the platform-specific specifications to select the hardware inventory from a set of predefined hardware clusters, wherein the hardware inventory comprises physical hardware assets comprising one or more of newly added hardware within the data center, a previously existing set of hardware within the data center, or remote hardware that communicates with the data center;
deriving the cluster-configuration file from data held within a stock-keeping unit (SKU) that describes the selected hardware inventory; and
populating the cluster-configuration file with abstract symbolic representations that serve as placeholders within the cluster-configuration file for expected values that are missing, wherein the abstract symbolic representations act to solicit network-topology values from the customer or via an automated mechanism, wherein the cluster-configuration file is employed to validate the identified hardware inventory upon delivery of the hardware inventory, wherein a discovered topology of the hardware inventory is cross-referenced with an expected physical topology in the cluster-configuration file, wherein the discovered topology comprises at least in part device locations and an existing wiring pattern of devices within a rack, and wherein the expected physical topology in the cluster-configuration file comprises at least in part expected device locations and an expected wiring pattern of the devices within the rack;
providing the abstract symbolic representations in the cluster-configuration file to the customer or the automated mechanism for resolution of the abstract symbolic representations; and
a second build-out mechanism software component that generates, from the network-topology values and information extracted from the cluster-configuration file, a template file by using a naming-convention mapping to convert the abstract symbolic representations into concrete values of network-topology configuration settings, wherein the template file is used to allocate the physical hardware assets and logical assets of the hardware inventory, wherein at least a portion of the physical hardware assets and logical assets are predefined in one or more predefined hardware clusters, the predefined hardware clusters represent predetermined compatible configurations of the physical hardware assets and logical assets,
wherein the second build-out mechanism further utilizes the template file to configure the physical hardware assets with configuration setting values based at least in part on the updated cluster-configuration file, and
wherein the configuring integrates the physical hardware assets into the fabric of the data center; and
wherein the second build-out mechanism further controls interaction between the integrated physical hardware assets and existing hardware by way of the configuring.

17. A computerized method for automatically integrating an inventory of hardware, selected based on specifications of a customer, within a fabric of a data center, the method comprising:
receiving a dependency schema that describes additional storage or computing capacity for use by the customer, wherein the dependency schema specifies logical artifacts and device parameters for requisitioning the additional capacity;
automatically selecting stock-keeping units (SKUs) from a set of SKUs based on, in part, information received within the dependency schema, wherein the SKUs identify predefined hardware clusters respectively, that are capable of being integrated within a cloud-computing network, the predefined hardware clusters represent predetermined compatible configurations of hardware assets and logical assets, and wherein automatically selecting comprises:

using the logical artifacts to designate a network configuration that is supported by one or more of the predefined hardware clusters;

using the device parameters to designate network resources that are included within the one or more of the predefined hardware clusters; and selecting a SKU from the set of SKUs that identifies a hardware inventory from the one or more predefined hardware clusters, wherein the hardware inventory supports the network configuration and includes the network resources, and wherein the identified hardware inventory comprises physical hardware assets, wherein the physical hardware assets comprise one or more of newly added hardware within the data center, a previously existing set of hardware within the data center, or remote hardware that communicates with the datacenter;

deriving a cluster-configuration file from the SKU, wherein the cluster-configuration file includes abstract symbolic representations that solicit feedback from a build-out operator, wherein the abstract symbolic representations serve as placeholders within the cluster-configuration file for expected network-topology values that are missing;

sending the cluster-configuration file to the build-out operator or an automated mechanism for resolution of the abstract symbolic representations;

receiving feedback from the build-out operator or the automated mechanism that addresses the abstract symbolic representations indicating missing network-topology values, wherein the feedback comprises network-topology values;

updating the cluster-configuration file by incorporating the network-topology values thereto;

using the updated cluster-configuration, validating the identified hardware inventory upon delivery of the hardware inventory based on cross-referencing, a discovered topology of the hardware inventory with an expected topology in the updated cluster-configuration file, wherein the discovered topology comprises at least in part device locations and wiring within a rack; and configuring the physical hardware assets with configuration setting values based at least in part on the updated cluster-configuration file, wherein the configuring integrates the physical hardware assets into the fabric of the data center; and controlling interaction between the integrated physical hardware assets and existing hardware by way of the configuring.

18. The computerized method of claim 17, wherein the method further comprises gaining access to the hardware inventory.

19. The computerized method of claim 18, wherein the method further comprises employing the updated cluster-configuration file to conduct an initial verification of components within the hardware inventory.

20. The computerized method of claim 17, wherein the dependency schema includes external specifications indicated by the customer and internal specifications automatically generated as a function of the external specifications.

* * * * *